(12) United States Patent
Hsia

(10) Patent No.: US 6,880,850 B2
(45) Date of Patent: Apr. 19, 2005

(54) STROLLER SUITABLE FOR SEATING AND RECLINING OF A BABY

(76) Inventor: Ben M. Hsia, 19401 Business Center Dr., Northridge, CA (US) 91324

( * ) Notice: Subject to any disclaimer, the term of this patent is extended or adjusted under 35 U.S.C. 154(b) by 79 days.

(21) Appl. No.: 10/453,652

(22) Filed: Jun. 4, 2003

(65) Prior Publication Data

US 2004/0245747 A1 Dec. 9, 2004

(51) Int. Cl.⁷ .............................................. B62B 7/06
(52) U.S. Cl. ...................... 280/642; 280/650; 280/658; 280/47.4
(58) Field of Search .............................. 280/642, 641, 280/643, 647, 648, 649, 650, 47.41, 47.4, 280/47.38, 47.34, 47.36, 47.39, 30, 657, 280/658; 297/464, 238

(56) References Cited

U.S. PATENT DOCUMENTS

| 4,741,551 | A | * | 5/1988 | Perego | 280/642 |
| 5,662,380 | A | * | 9/1997 | Tam et al. | 297/354.12 |
| 5,988,670 | A | * | 11/1999 | Song et al. | 280/648 |
| 6,189,914 | B1 | * | 2/2001 | Worth et al. | 280/642 |
| 6,557,871 | B1 | * | 5/2003 | Hsia | 280/47.38 |
| 6,669,225 | B1 | * | 12/2003 | Greger et al. | 280/648 |
| 2003/0052474 | A1 | * | 3/2003 | Yang et al. | 280/642 |
| 2003/0227158 | A1 | * | 12/2003 | Kassai et al. | 280/642 |
| 2004/0061312 | A1 | * | 4/2004 | Kassai et al. | 280/643 |
| 2004/0124611 | A1 | * | 7/2004 | Gong et al. | 280/642 |
| 2004/0140648 | A1 | * | 7/2004 | Takubo et al. | 280/642 |

FOREIGN PATENT DOCUMENTS

| DE | 3901743 A1 | * | 1/1988 |
| JP | 0481452 A1 | * | 4/1992 |

* cited by examiner

*Primary Examiner*—Christopher P. Ellis
*Assistant Examiner*—J. Allen Shriver
(74) *Attorney, Agent, or Firm*—Morgan Lewis & Bockius LLP

(57) ABSTRACT

The seat unit of a stroller includes a seat frame mounted on a stroller frame, a backrest frame unit, and a pad assembly. The backrest frame unit includes a backrest support mounted on the seat frame, and a movable frame member connected pivotally to the backrest support and pivotable from a folded position, where the movable frame member is disposed proximate to the backrest support to form a seating space adapted for seating of a baby therein, to an unfolded position, where the movable frame member extends inclinedly from the backrest support to form a reclining space adapted for reclining of the baby therein. The pad assembly includes a seat pad, a back pad and a backrest pad mounted on the seat frame, the backrest support and the movable frame member, respectively.

9 Claims, 7 Drawing Sheets

STROLLER SUITABLE FOR SEATING AND RECLINING OF A BABY

BACKGROUND OF THE INVENTION

1. Field of the Invention

The invention relates to a stroller, more particularly to a stroller that is suitable for seating and reclining of a baby.

2. Description of the Related Art

As shown in FIG. 1, a conventional stroller includes a stroller frame 1, a seat 2, a footrest 3, a foldable canopy 4, and a storage basket 5. The stroller frame 1 includes a lower frame section mounted with a wheel set 101, an upper frame section provided with a handle unit 102, and a middle frame section between the lower and upper frame sections and mounted with the seat 2, thereby forming a seating space for a baby (not shown). The footrest 3 is mounted on the lower frame section. The canopy 4 is mounted on the upper frame section and is used to provide a shade for the seat 2. The storage basket 5 is disposed below the seat 2 for storage purposes.

It is noted that the seating space arrangement provided in the aforesaid conventional stroller is not suitable for infants who are unable to sit properly. For infants, a reclining space is more practical than a space for seating.

SUMMARY OF THE INVENTION

Therefore, the object of the present invention is to provide a stroller suitable for seating and reclining of a baby so as to overcome the aforesaid drawback of the prior art.

Accordingly, a stroller of this invention comprises a stroller frame and a seat unit.

The stroller frame includes a wheeled lower frame section, an upper frame section provided with a handle unit, and a middle frame section between the lower and upper frame sections.

The seat unit includes a horizontally extending seat frame, a backrest frame unit, and a pad assembly. The seat frame is mounted on the middle frame section of the stroller frame. The backrest frame unit includes a backrest support mounted on and extending uprightly from the seat frame, and a movable frame member connected pivotally to the backrest support and pivotable from a folded position, where the movable frame member is disposed proximate to the backrest support, to an unfolded position, where the movable frame member is moved away and extends inclinedly from the backrest support and where the movable frame member is disposed above the seat frame. The pad assembly includes a seat pad mounted on the seat frame, a back pad mounted on the backrest support, and a backrest pad mounted on the movable frame member.

The seat pad, the back pad, and the backrest pad have opposite lateral sides. The pad assembly further includes a foldable connecting unit interconnecting the back pad and the backrest pad at the lateral sides of the back pad and the backrest pad. The foldable connecting unit is capable of holding the movable frame member at the unfolded position when stretched.

The seat pad and the backrest pad cooperate to form a seating space adapted for seating of a baby therein when the movable frame member is disposed at the folded position.

The backrest pad and the back pad cooperate to form a reclining space adapted for reclining of the baby therein when the movable frame member is disposed at the unfolded position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
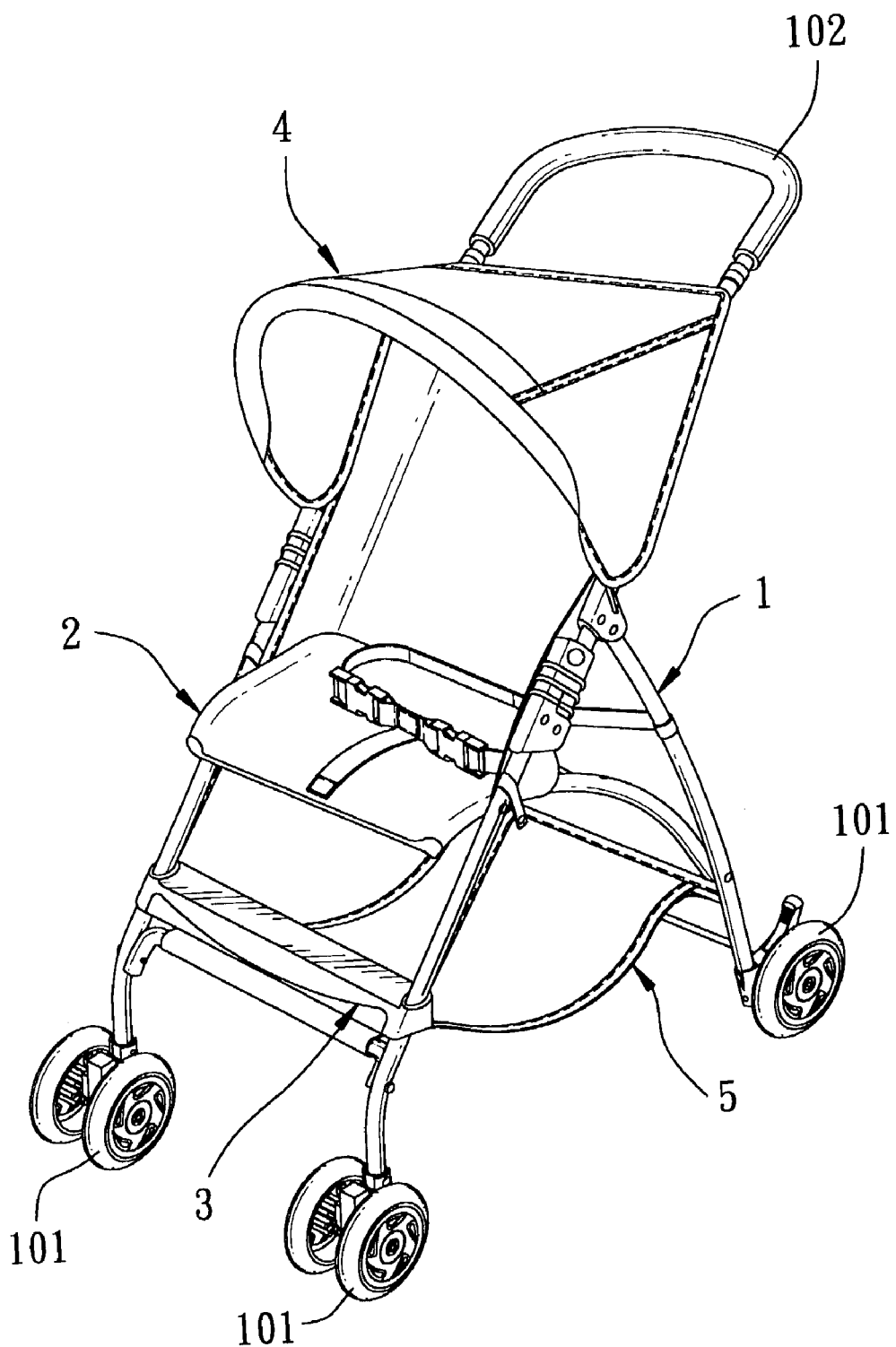
FIG. 1 is a perspective view of a conventional stroller.
Figure 2:
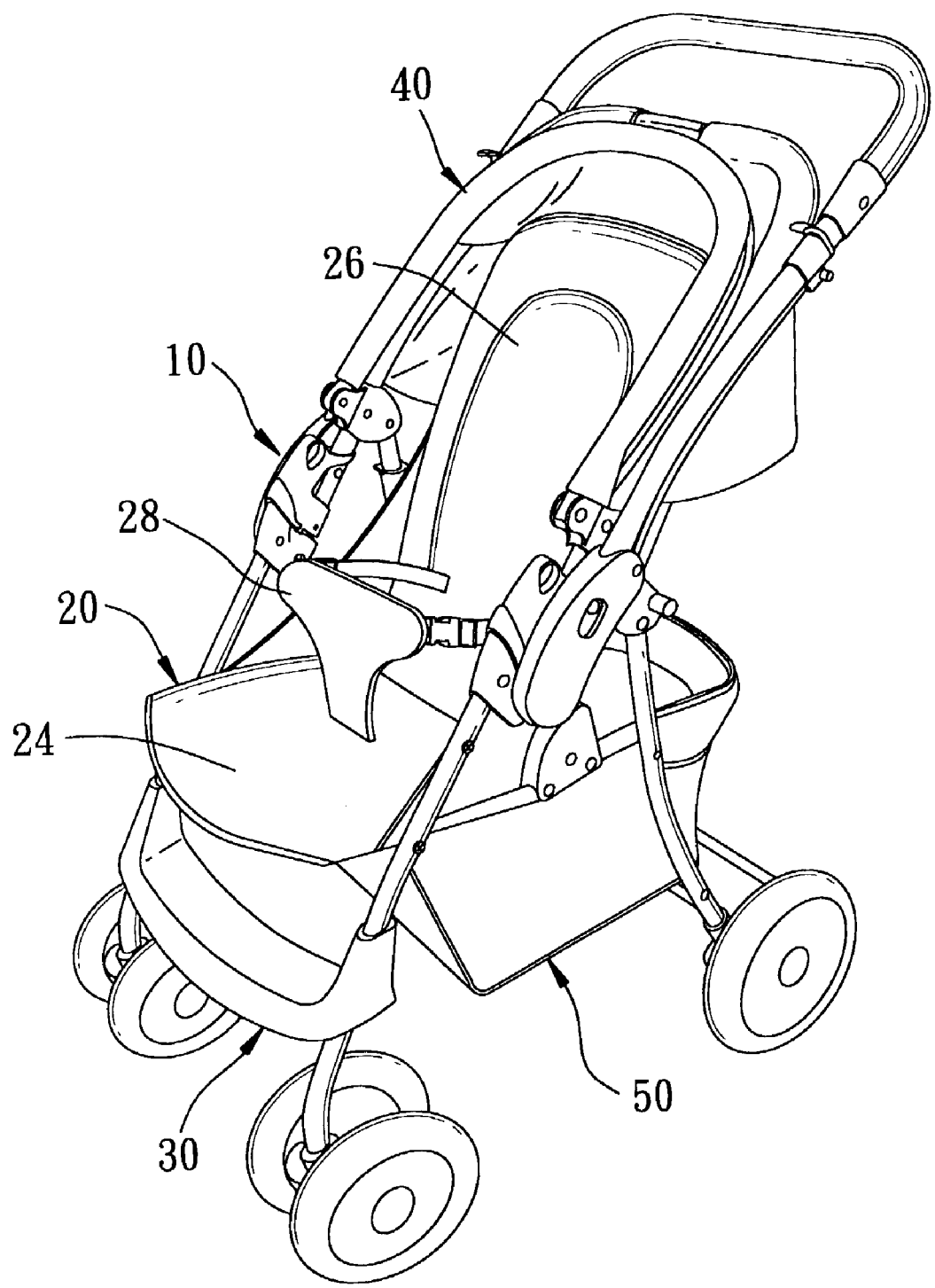
FIG. 2 is a perspective view of the preferred embodiment of a stroller according to the present invention.
Figure 3:
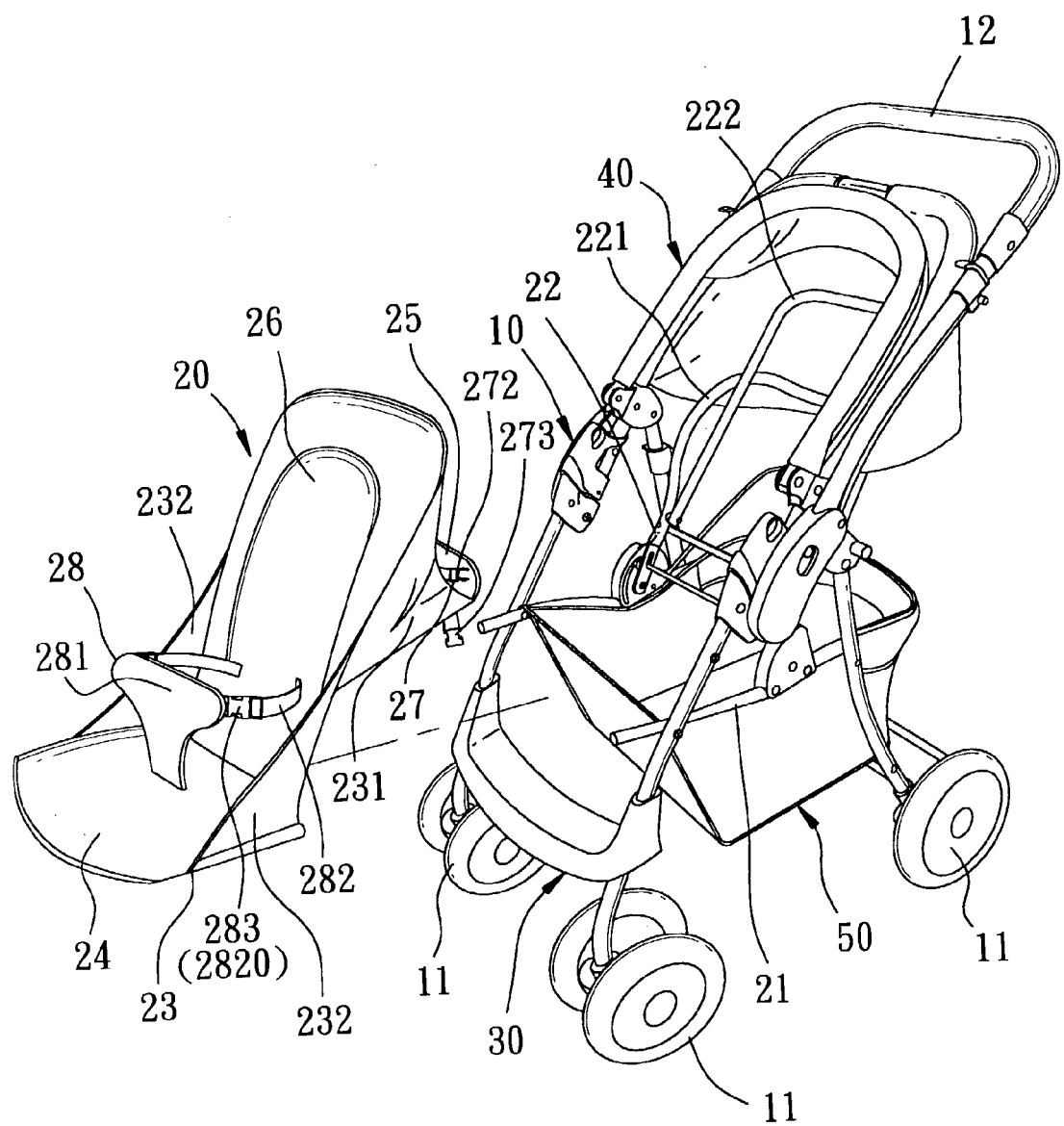
FIG. 3 is a partly exploded perspective view of the preferred embodiment of a stroller according to the present invention.

Referring to FIGS. 2 and 3, the preferred embodiment of a stroller according to the present invention is shown to comprise a stroller frame 10, a seat unit 20, a footrest 30, a canopy 40, and a storage basket 50.

The stroller frame 10 includes a lower frame section mounted with a wheel set 11, an upper frame section provided with a handle unit 12, and a middle frame section between the lower and upper frame sections. Since the specific construction of the stroller frame 10 is known in the art and is not pertinent to the claimed invention, a detailed description of the same is dispensed with herein for the sake of brevity.

The seat unit 20 includes a horizontally extending seat frame 21, a backrest frame unit 22, and a pad assembly 23.

The seat frame 21 is mounted on the middle frame section of the stroller frame 10. The backrest frame unit 22 includes a backrest support 221 and a movable frame member 222. The backrest support 221 has a lower end connected to a rear part of the seat frame 21, and extends uprightly from the seat frame 21. The movable frame member 222 is connected pivotally to an intermediate section of the backrest support 221, and is pivotable from a folded position (see FIG. 3), where the movable frame member 222 is disposed proximate to the backrest support 221, to an unfolded position, where the movable frame member 222 is moved away and extends inclinedly from the backrest support 221 and where the movable frame member 222 is disposed above the seat frame 21.

Figure 4:
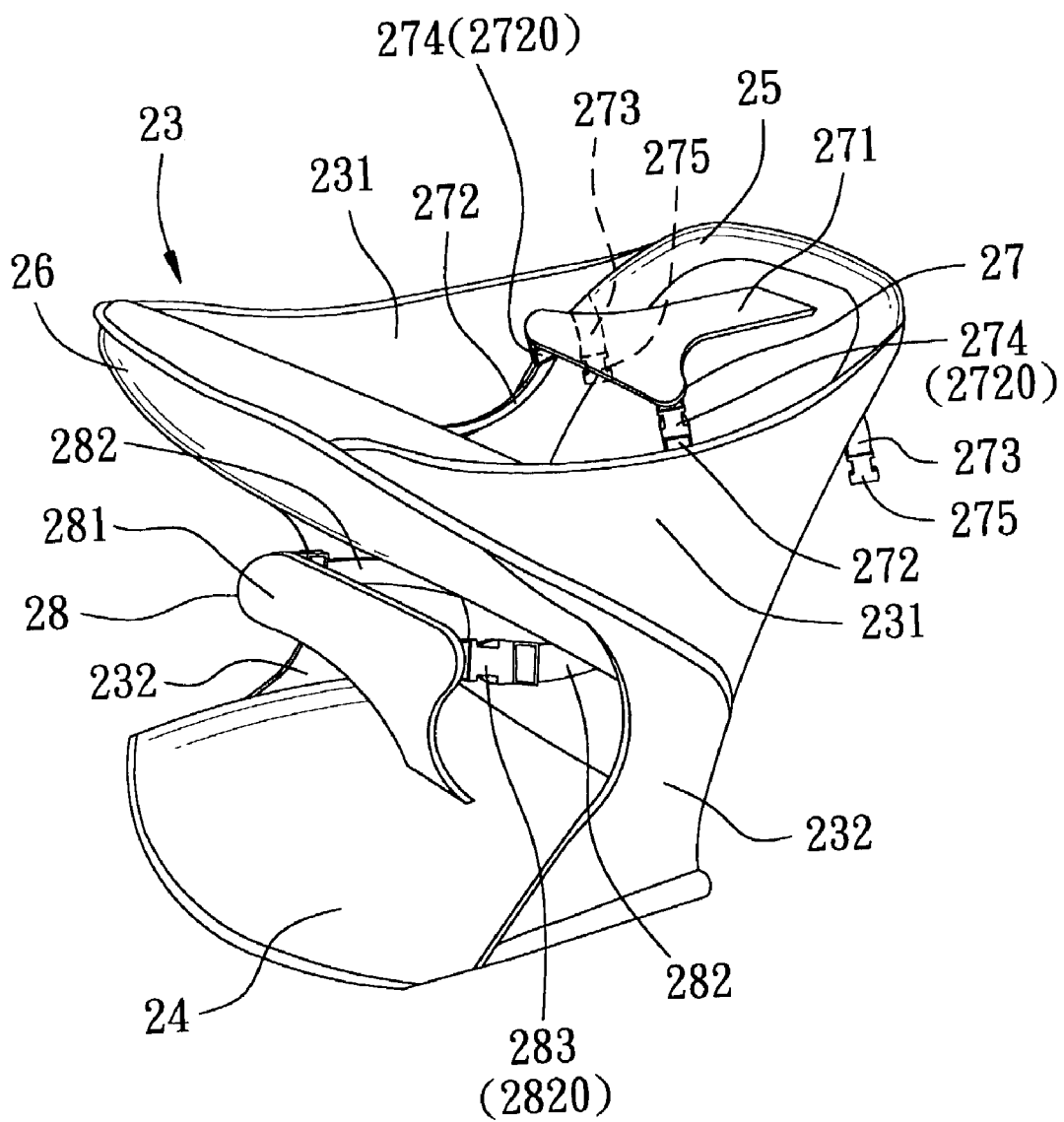
FIG. 4 is a perspective view illustrating a pad assembly of a seat unit of the preferred embodiment.

With further reference to FIG. 4, the pad assembly 23 includes a seat pad 24 mounted on the seat frame 21, a back pad 25 mounted on the backrest support 221, and a backrest pad 26 mounted on the movable frame member 222. In this embodiment, the seat pad 24, the back pad 25 and the backrest pad 26 are sleeved on the seat frame 21, the backrest support 221 and the movable frame member 222, respectively.

The seat pad 24, the back pad 25, and the backrest pad 26 have opposite lateral sides. The pad assembly 23 further includes a foldable connecting unit interconnecting the back pad 25 and the backrest pad 26 at the lateral sides of the back pad 25 and the backrest pad 26. The foldable connecting unit includes a pair of first fabric flaps 231, and is capable of holding the movable frame member 222 at the unfolded position when stretched. The pad assembly 23 further includes a pair of second fabric flaps 232 interconnecting the backrest pad 26 and the seat pad 24 at the lateral sides of the backrest pad 26 and the seat pad 24 for strengthening the overall construction of the pad assembly 23 and for protection purposes.

Figure 5:
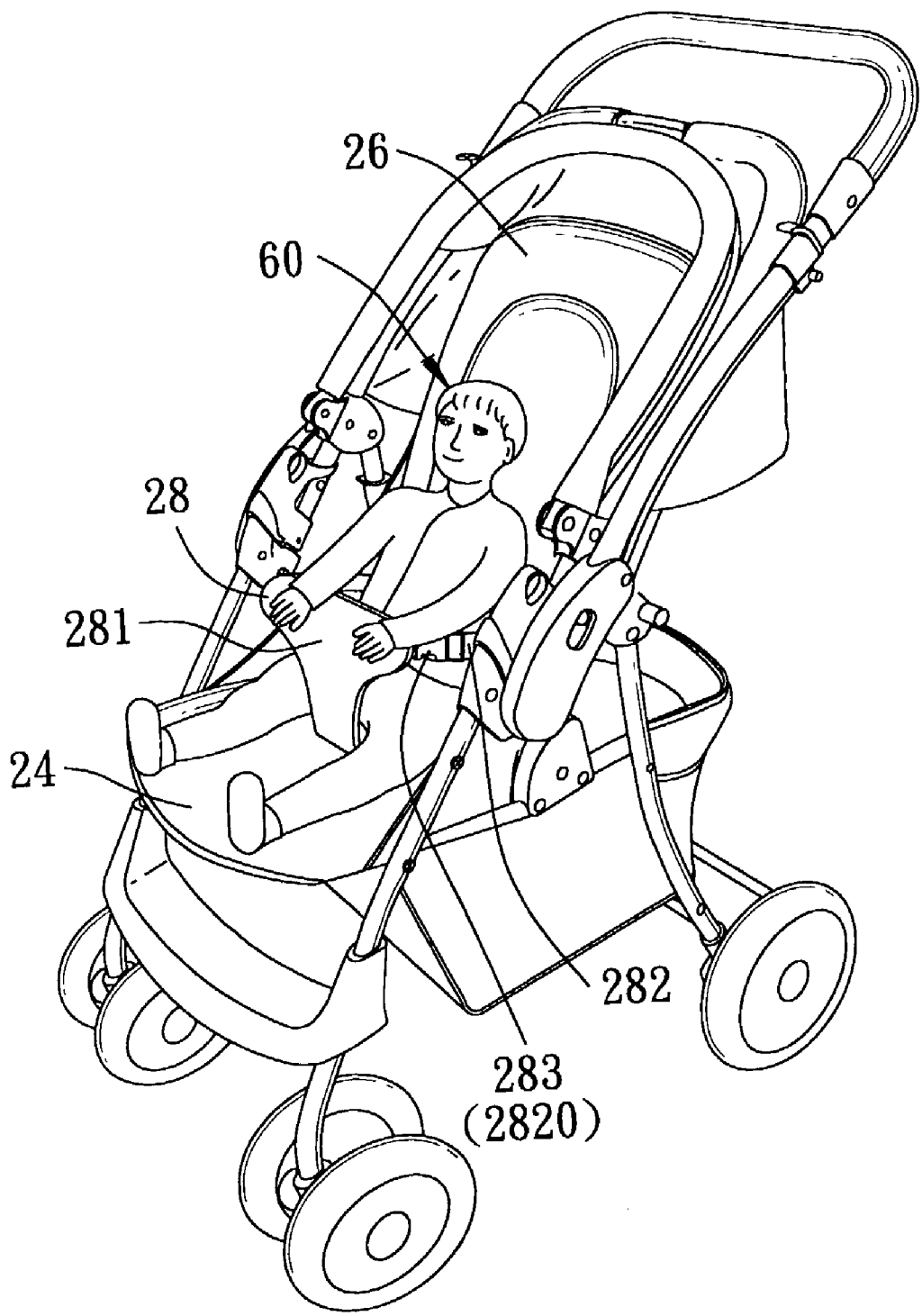
FIG. 5 is a perspective view showing the preferred embodiment when used for seating of a baby.

With further reference to FIG. 5, the seat pad 24 and the backrest pad 26 cooperate to form a seating space adapted for seating of a baby 60 therein when the movable frame member 222 is disposed at the folded position. Moreover, with further reference to FIG. 7, the backrest pad 26 and the back pad 25 cooperate to form a reclining space adapted for reclining of a baby 70 therein when the movable frame member 222 is disposed at the unfolded position.

Figure 7:
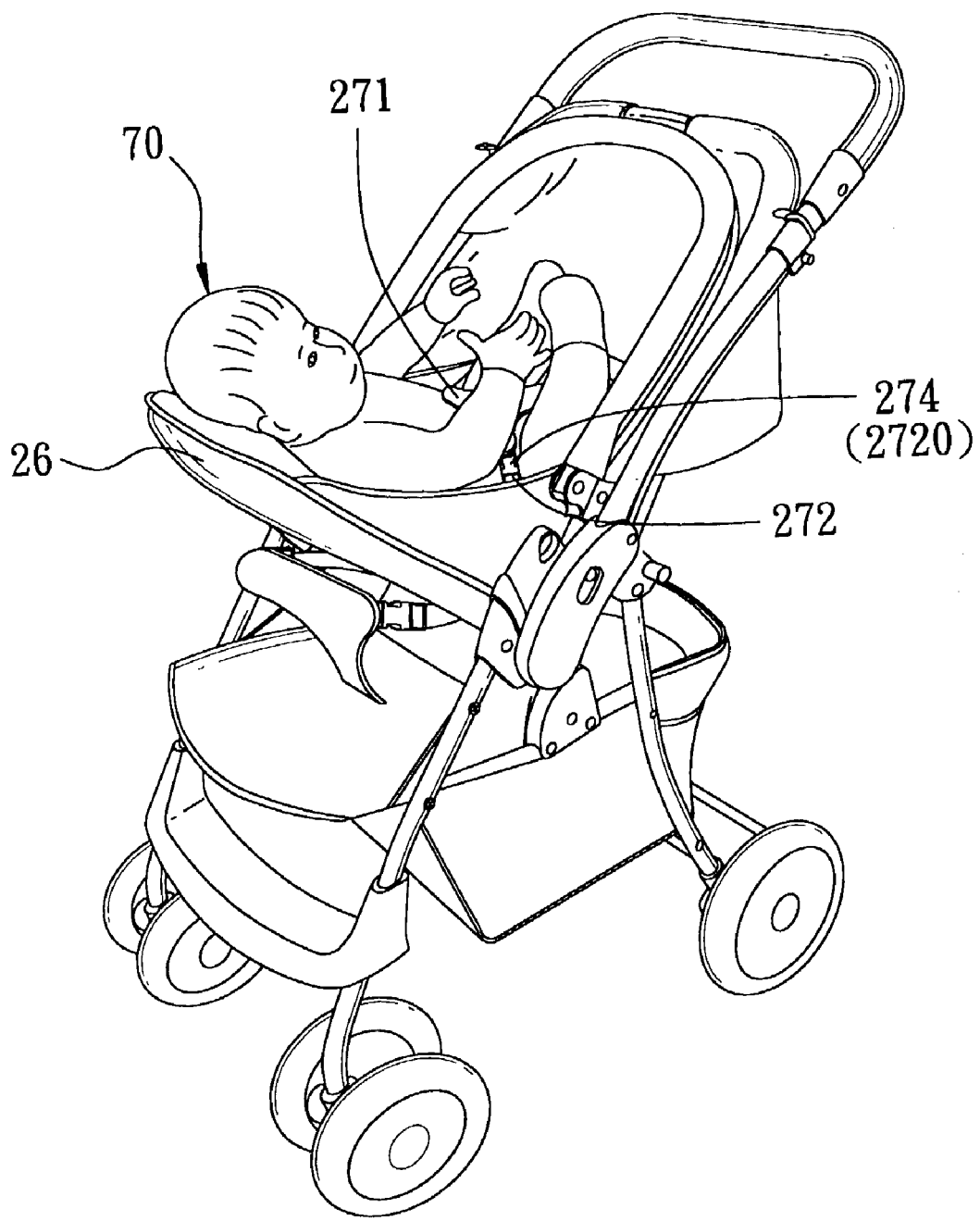
FIG. 7 is a perspective view showing the preferred embodiment when used for reclining of a baby.

The pad assembly 23 further includes a first safety belt device 27 adapted for retaining the baby 70 in the reclining space, as best shown in FIG. 7. The first safety belt device 27 includes a generally T-shaped restraint 271, a pair of first straps 272, and a pair of second straps 273.

The T-shaped restraint 271 has a first section connected to a front side of the back pad 25, and a second section transverse to the first section and having opposite ends, each of which is provided with a first fastener 274.

Each of the first straps 272 is connected to a respective lateral side of the backrest pad 26, and is provided with a second fastener 2720 for engaging releasably the first fastener 274 on a respective one of the ends of the second section of the restraint 271 so as to be adapted to retain the baby 70 in the reclining space.

Figure 6:
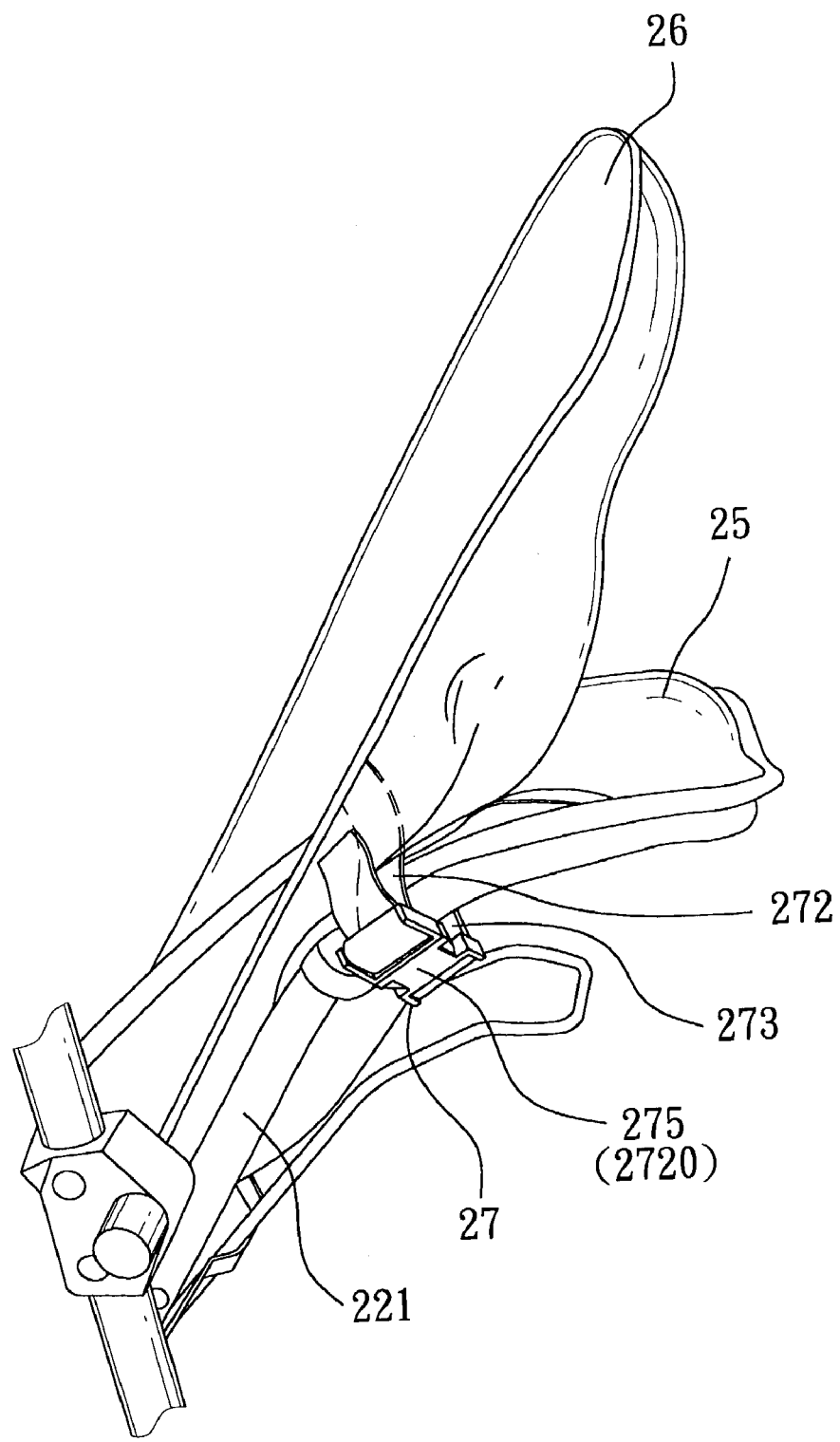
FIG. 6 is a fragmentary perspective view of the preferred embodiment to illustrate how a movable frame member of the seat unit is retained at a folded position.

Each of the second straps 273 is connected to a respective lateral side of the back pad 25, and is provided with a third fastener 275 for engaging releasably the second fastener 2720 on a respective one of the first straps 272 so as to retain the movable frame member 222 at the folded position, as best shown in FIG. 6.

In this embodiment, the first and third fasteners 274, 275 are female fasteners, and the second fastener 2720 on each of the first straps 272 is a male fastener.

The pad assembly 23 further includes a second safety belt device 28 adapted for retaining the baby 60 in the seating space, as best shown in FIG. 6. The second safety belt device 28 includes a generally T-shaped restraint 281 and a pair of straps 282.

The T-shaped restraint 281 has a first section connected to a top side of the seat pad 24, and a second section transverse to the first section and having opposite ends, each of which is provided with a first fastener 283.

Each of the straps 282 is connected to the backrest pad 26 adjacent to a respective lateral side of the backrest pad 26, and is provided with a second fastener 2820 for engaging releasably the first fastener 283 on a respective one of the ends of the second section of the restraint 281 so as to be adapted to retain the baby 60 in the seating space (see FIG. 5). In this embodiment, the first and second fasteners 283, 2820 are female and male fasteners, respectively.

Referring again to FIG. 2, the footrest 30 is mounted on the lower frame section of the stroller frame 10 and is disposed at a level below the seat unit 20. The canopy 40 is mounted on the upper frame section of the stroller frame 10 and is disposed above the seat unit 20. The canopy 40 can be folded and unfolded in a conventional manner to provide a shade for the seat unit 20. The storage basket 50 is disposed below the seat unit 20 for storage purposes.

Referring to FIGS. 5 and 6, when the stroller is used for seating the baby 60 thereon, the fasteners 2720, 275 of the first safety belt device 27 are inter-engaged to bind together the backrest pad 26 and the back pad 25, thereby retaining the movable frame member 222 (see FIG. 2) at the folded position. When the baby 60 is seated in the seating space formed by the seat pad 24 and the backrest pad 26 such that the back of the baby 60 rests on the backrest pad 26 and such that the restraint 281 of the second safety belt device 28 is disposed between the legs of the baby 60, the fasteners 283, 2820 of the second safety belt device 28 are inter-engaged so as to be adapted to retain the baby 60 in the seating space.

Referring to FIGS. 4 and 7, when the stroller is used for reclining the baby 70 thereon, the fasteners 2720 on the first straps 272 are disengaged from the fasteners 275 on the second straps 273, and the movable frame member 222 (see FIG. 2) is pivoted to the unfolded position. When the baby 70 is laid in the reclining space formed by the backrest pad 26 and the back pad 25 such that the back of the baby 70 rests on the backrest pad 26 and such that the restraint 271 of the first safety belt device 27 is disposed between the legs of the baby 70, the fasteners 274, 2720 of the first safety belt device 27 are inter-engaged so as to be adapted to retain the baby 70 in the reclining space.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A stroller comprising:
   a stroller frame including a wheeled lower frame section, an upper frame section provided with a handle unit, and a middle frame section between said lower and upper frame sections; and
   a seat unit including
      a horizontally extending seat frame mounted on said middle frame section of said stroller frame,
      a backrest frame unit including a backrest support mounted on and extending uprightly from said seat frame, and a movable frame member connected pivotally to said backrest support and pivotable from a folded position, where said movable frame member is disposed proximate to said backrest support, to an unfolded position, where said movable frame member is moved away and extends inclinedly from said backrest support and where said movable frame member is disposed above said seat frame, and
      a pad assembly including a seat pad mounted on said seat frame, a back pad mounted on said backrest support, a backrest pad mounted on said movable frame member,
      said seat pad, said back pad, and said backrest pad having opposite lateral sides, said pad assembly further including a foldable connecting unit interconnecting said back pad and said backrest pad at said lateral sides of said back pad and said backrest pad, said foldable connecting unit being capable of holding said movable frame member at the unfolded position when stretched,
      said seat pad and said backrest pad cooperating to form a seating space adapted for seating of a baby therein when said movable frame member is disposed at the folded position,
      said backrest pad and said back pad cooperating to form a reclining space adapted for reclining of the baby therein when said movable frame member is disposed at the unfolded position.

2. The stroller as claimed in claim 1, wherein said foldable connecting unit includes a pair of fabric flaps connected to said lateral sides of said back pad and said backrest pad.

3. The stroller as claimed in claim 1, wherein said pad assembly further includes a pair of fabric flaps interconnecting said lateral sides of said backrest pad and said seat pad.

4. The stroller as claimed in claim 1, wherein said pad assembly further includes a safety belt device adapted for retaining the baby in said reclining space.

5. The stroller as claimed in claim 4, wherein said back pad has a front side, and said safety belt device includes:
   a generally T-shaped restraint having a first section connected to said front side of said back pad, and a second section transverse to said first section and having opposite ends, each of which is provided with a first fastener;
   a pair of first straps connected to said backrest pad, each of said first straps being provided with a second fastener for engaging releasably said first fastener on a respective one of said ends of said second section of said restraint so as to be adapted to retain the baby in said reclining space; and
   a pair of second straps connected to said back pad, each of said second straps being provided with a third fastener for engaging releasably said second fastener on a respective one of said first straps so as to retain said movable frame member at the folded position.

6. The stroller as claimed in claim 5, wherein said first and third fasteners are female fasteners, and said second fastener on each of said first straps is a male fastener.

7. The stroller as claimed in claim 1, wherein said pad assembly further includes a safety belt device adapted for retaining the baby in said seating space.

8. The stroller as claimed in claim 7, wherein said seat pad has atop side, and said safety belt device includes:
   a generally T-shaped restraint having a first section connected to said top side of said seat pad, and a second section transverse to said first section and having opposite ends, each of which is provided with a first fastener; and
   a pair of straps connected to said backrest pad, each of said straps being provided with a second fastener for engaging releasably said first fastener on a respective one of said ends of said second section of said restraint so as to be adapted to retain the baby in said seating space.

9. The stroller as claimed in claim 8, wherein said first and second fasteners are female and male fasteners, respectively.

* * * * *